(12) United States Patent
Donaldson

(10) Patent No.: US 7,864,373 B2
(45) Date of Patent: Jan. 4, 2011

(54) METHOD AND SYSTEM FOR TONER REPRODUCTION CURVE LINEARIZATION USING LEAST SQUARES SOLUTION OF MONOTONE SPLINE FUNCTIONS

(75) Inventor: Patricia Joanne Donaldson, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 420 days.

(21) Appl. No.: 12/127,093

(22) Filed: May 27, 2008

(65) Prior Publication Data

US 2009/0296106 A1    Dec. 3, 2009

(51) Int. Cl.
- H04N 1/60 (2006.01)
- H04N 1/407 (2006.01)
- H04N 1/46 (2006.01)
- G06K 9/40 (2006.01)
- G03G 15/00 (2006.01)
- B41J 2/47 (2006.01)

(52) U.S. Cl. ............. 358/1.9; 358/3.01; 358/3.26; 358/504; 382/162; 382/167; 382/275; 399/49; 399/53; 347/251

(58) Field of Classification Search .......... 358/1.9, 358/3.01, 3.26, 504; 382/162, 167, 275; 399/49, 53; 347/251
See application file for complete search history.

(56) References Cited

U.S. PATENT DOCUMENTS

| | | | |
|---|---|---|---|
| 5,543,935 A | 8/1996 | Harrington | |
| 5,625,716 A | 4/1997 | Borg | |
| 5,777,656 A * | 7/1998 | Henderson | 347/251 |
| 5,963,244 A | 10/1999 | Mestha et al. | |
| 6,384,928 B2 | 5/2002 | Nagasawa et al. | |
| 6,512,597 B1 | 1/2003 | Cooper et al. | |
| 6,624,911 B1 | 9/2003 | Cooper et al. | |
| 6,697,582 B1 * | 2/2004 | Scheuer | 399/49 |
| 6,775,029 B1 | 8/2004 | Wen et al. | |
| 7,054,030 B2 * | 5/2006 | Maltz | 358/1.9 |
| 7,190,490 B2 | 3/2007 | Cooper et al. | |
| 7,272,333 B2 | 9/2007 | Mizes | |
| 2007/0196124 A1 | 8/2007 | Thayer | |
| 2007/0273900 A1 | 11/2007 | Bai | |

* cited by examiner

*Primary Examiner*—Charlotte M Baker
(74) *Attorney, Agent, or Firm*—Fay Sharpe LLP

(57) ABSTRACT

Methods are presented for calibrating or characterizing a printing system with respect to at least one color, in which a toner reproduction curve (TRC) is measured and curve-fitted according to a least squares solution using a set of spline basis functions having high spline density in regions of high TRC curvature and/or high measurement noise, with the weights of the spline functions being restricted to positive values to maintain monotonicity of the TRC.

17 Claims, 11 Drawing Sheets

$$I_i(3) = \begin{cases} 0 & x < t_i \\ \dfrac{(x-t_i)^3}{(t_{i+1}-t_i)(t_{i+2}-t_i)(t_{i+3}-t_i)} & t_i \leq x < t_{i+1} \\ \left[\dfrac{3(x^2-t_{i+1}^2)(t_{i+2}t_{i+3}-t_it_{i+1})+((x^3-t_{i+1}^3)+3(x-t_{i+1})t_it_{i+1})(t_{i+2}-t_{i+1})-((x^3-t_{i+1}^3)+3(x-t_{i+1})t_{i+1}t_{i+2})(t_{i+3}-t_i)}{(t_{i+1}-t_i)(t_{i+3}-t_i)(t_{i+2}-t_{i+1})(t_{i+2}-t_i)} \right] & t_{i+1} \leq x < t_{i+2} \\ 1 - \dfrac{(t_{i+3}-x)^3}{(t_{i+3}-t_i)(t_{i+3}-t_{i+1})(t_{i+3}-t_{i+2})} & t_{i+2} \leq x < t_{i+3} \\ 1 & t_{i+3} \leq x \end{cases}$$

FIG. 2

METHOD AND SYSTEM FOR TONER REPRODUCTION CURVE LINEARIZATION USING LEAST SQUARES SOLUTION OF MONOTONE SPLINE FUNCTIONS

BACKGROUND

The present disclosure is generally related to the field of color image/text printing or display systems and to methods and systems for calibrating color output devices, such as color displays, printers and printing devices thereof. Color has become essential as a component of communication and facilitates the sharing of knowledge and ideas, and there are continuous efforts to improve the accuracy and total image quality of digital color output devices. Color images are commonly represented as one or more separations, each including color density signals for a single primary or secondary color. Color density signals are commonly represented as digital gray or contone pixels, varying in magnitude from a minimum to a maximum, with a number of gradients between corresponding to the bit density of the system, where a common 8-bit system provides 256 shades of each primary color. A color can therefore be considered the combination of magnitudes of each pixel, which when viewed together, present the combination color, with color printer signals typically including three subtractive primary color signals Cyan (C), Magenta (M), and Yellow (Y) and a Black signal (K), which together can be considered the printer colorant signals. Each color signal forms a separation and when combined together with the other separations, forms the color image. Color images, text, and other features in a given document or print job are generally specified as image data in a printer-independent form (color space) based on the characteristics of human vision to facilitate the exchange and reuse of documents.

The native control spaces of output devices in a printing system, however, are not printer-independent color spaces. Consequently, printing systems are characterized and calibrated by determining the device control values corresponding to specified printer-independent color values in order to print a given color. This is normally accomplished by a three-step procedure. Initially, a set of color patches with predetermined device control values is output on the device and the color of each patch is measured in printer-independent color coordinates. This may include printing test patches on a sheet of paper and measuring the resulting patch colors or transferring toner or other marking material onto an intermediate medium (e.g., an intermediate transfer belt or photoreceptor in the system) and measuring the color of the transferred material. Next, a "forward device-response function" or forward transform is estimated using the device control values and the corresponding measured printer-independent color values, sometimes referred to as a measured toner response curve (TRC), which represents a mapping from device control values to the printer-independent-color values produced by the device in response to the control values. The forward response function is then inverted to obtain a "device-correction-function" or inverse transform that maps each printer-independent color to the device control values that produce the specified printer-independent color value on the output device, and this is stored in the printer. In operation, the printer-independent color values of a given print job are mapped through the "device correction-function" to obtain control values that are used by the rendering devices of the printer to produce the desired color. By this process, the printing system transfer function from input (device-independent) data to output (printed media) is calibrated and essentially linearized. An example of a calibration system is described in U.S. Pat. No. 5,305,119 to Rolleston et al, "Color Printer Calibration Architecture," which issued on Apr. 19, 1994 and is assigned to Xerox Corporation, and which is generally directed toward a method of calibrating a response of a printer to an image described in terms of calorimetric values. Another example of a calibration method and system is described in U.S. Pat. No. 5,528,386 to Rolleston et al, "Color Printer Calibration Architecture", which issued on Jun. 18, 1996 and is also assigned to Xerox Corporation, and which describes a conventional one-dimensional architecture. Both U.S. Pat. Nos. 5,305,119 and 5,528,386 are incorporated herein by reference.

Calibration and/or characterization of color printers is often subject to different forms of noise. In particular, digital correction of a printer TRC often requires measuring points along the TRC, and then projecting, for each desired density, how many pixels must be turned on to achieve that density. Typically a few points along the TRC are measured and a line is fit through the measured points using linear interpolation or other curve fitting techniques, or a parameterized function may be fit to the measured data. Conventional spline fitting can leave the fit too sensitive to measurement noise, which can induce contours. Parameterized functions are typically not flexible enough to cover the full range of TRC variation observed. Consequently, there remains a need for improved printing system calibration and characterization techniques to better fit measured TRCs to avoid or mitigate the effects of measurement noise while accurately characterizing the true machine performance.

BRIEF DESCRIPTION

Methods and systems are provided for color printer calibration or characterization and for determining the color response of a color printer in which spline basis functions are selected according to better fit the anticipated or observed curvature of the TRC, and a spline fitted TRC is generated using a least-squares solution, by which the above mentioned shortcomings of conventional TRC calibration and/or characterization can be mitigated. The disclosure presents techniques for fitting TRCs using a least-squares solution to a set of monotone spline basis functions to ensure that the output fit is monotonic, and the spline density can be selectively adjusted to provide flexibility in areas with known discontinuities, or areas where the slope is changing rapidly, while providing stiffness and noise reduction in smoothly varying sections of the TRC.

In accordance with one or more aspects of the present disclosure, a method is provided for calibrating and/or characterizing a printing system with respect to at least one color, which may be employed in connection with monotone printers, multi-color printers, etc. The method includes providing a set of spline basis functions as a vector [S], and providing a measured TRC that includes measured density values associated with a plurality of input density values, where the input density values are selected from values of a machine TRC. In certain preferred embodiments, the spline function density is set according to curvature and/or noise of the measured TRC, where the method may include defining high and low density regions in the machine TRC according to the measured TRC with the high density region(s) corresponding to an area of the measured TRC exhibiting higher measurement noise or higher curvature than the low density region(s), and providing a higher density of spline basis functions in the high density region(s) than in the low density region(s). In this manner, the resulting curve fit will be less susceptible to measurement noise and can provide better accuracy for high curvature portions of the machine TRC range. For multi-color systems, basis functions and measured TRCs may be provided for each color to be calibrated/characterized. The method further includes deriving a matrix [X] of weighting coefficients for the spline basis functions by determining a least-squares solution for the matrix equation [measured TRC]=[X]*[S], and constructing a spline fitted TRC based on the spline basis functions and the coefficient matrix. A binary dot file is formed according to the spline fitted TRC, and is loaded into the system for use in printing. In various implementations, a majority of the spline basis functions are of second or higher order. Moreover, an iterative curve fit can be employed in certain embodiments. In this case, if any of the weighting coefficients are negative, the solution is determined by setting the negative coefficients to zero, removing the corresponding function from the set of spline basis functions, and recalculating to determine an adjusted least-squares solution for the matrix equation to derive the weighting coefficients. In this manner, monotonicity is ensured in the fitted TRC. The binary dot file formation in certain embodiments may include forming a threshold array including a value corresponding to each value in the desired (or target) TRC, where the values of the threshold array indicate the number of pixels that must be turned on to achieve the target TRC value from the spline fitted TRC, providing a fill order list indicating the order in which each pixel of a digital pattern is turned on for the printer system, and forming the binary dot file including a value corresponding to each value in the fill order list, where the values of the binary dot file indicate the smallest index of the threshold array for which the threshold array value is greater than the value of the fill order list.

In accordance with further aspects of the disclosure, a method of calibrating or characterizing a printing system is provided, which includes providing a measured toner reproduction curve (TRC) including measured density values, defining at least one high density region and at least one low density region in the machine TRC where the high density region corresponds to an area of the measured TRC exhibiting higher measurement noise or higher curvature than the low density region, and providing a set of spline basis functions as a vector [S] having a higher density of spline basis functions in the high density region than in the low density region, and deriving a matrix of weighting coefficients for the basis functions by determining a solution for the matrix equation [measured TRC]=[X]*[S]. The method further includes constructing a spline fitted TRC based on the spline basis functions and the weighting coefficients, forming a binary dot file based at least in part on the spline fitted TRC, and loading the binary dot file into the printing system for use in printing.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

FIG. 2 is an exemplary set of equations used to provide a set of third order spline basis functions for use in the method of FIG. 1;

DETAILED DESCRIPTION

Figure 1:
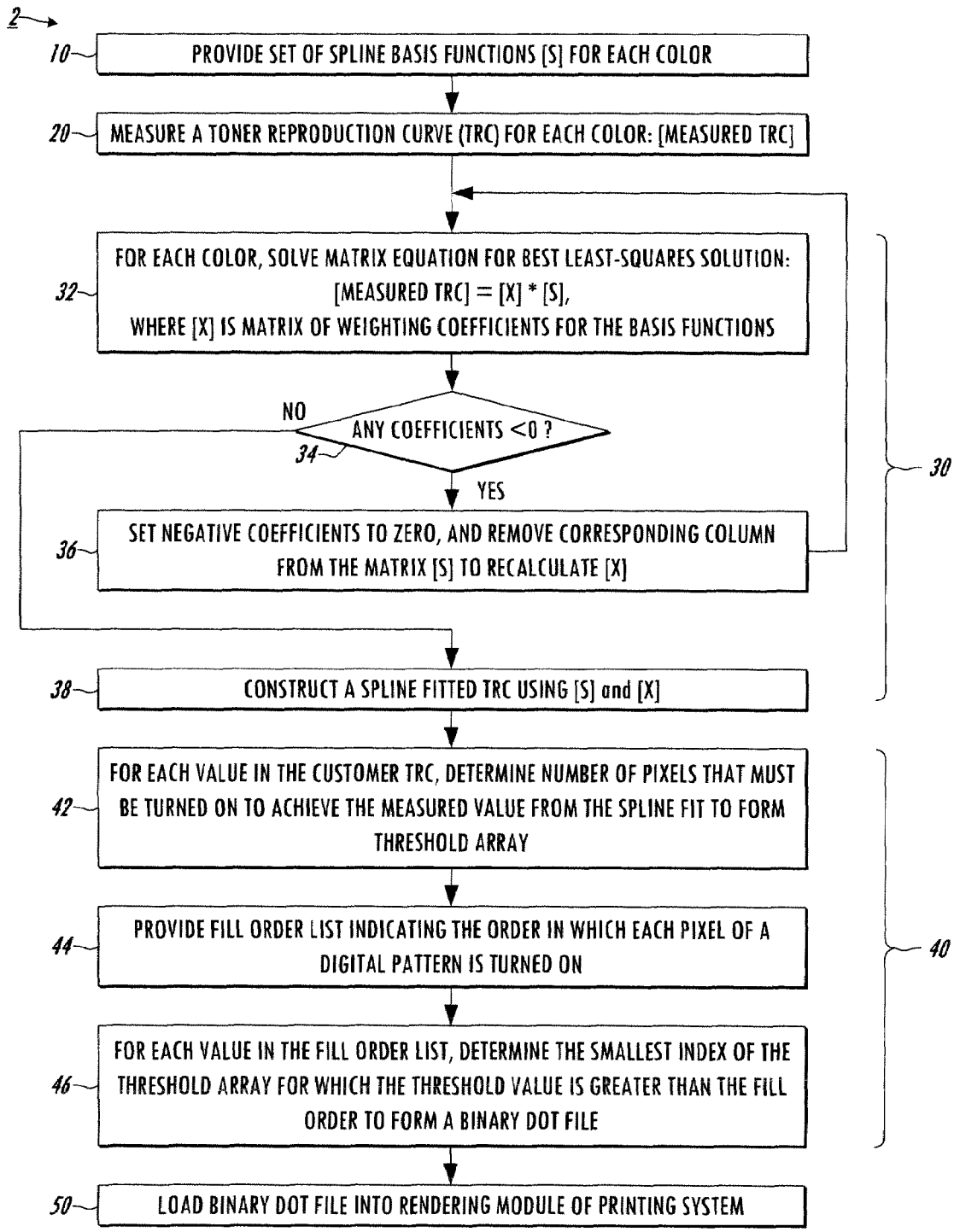
FIG. 1 is a flow diagram illustrating exemplary methods for calibrating and/or characterizing a printing system in accordance with one or more aspects of the present disclosure.

Referring now to the drawings, FIG. 1 illustrates an exemplary method 2 for characterizing and/or calibrating a printing or rendering system in accordance with one or more aspects of the present disclosure. Although the exemplary method 2 is illustrated and described below in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 2 and other methods of the disclosure may be implemented in hardware, software, or combinations thereof, whether in a single system or in distributed form in two or more components or systems, in order to characterize or calibrate a single or multi-color printing device or other device that renders single or multi-color images, and may be employed in any form of printing system including without limitation desktop printers, network printers, stand-alone copiers, multi-function printer/copier/facsimile devices, high-speed printing/publishing systems and digital printing presses, wherein the disclosure is not limited to the specific applications and implementations illustrated and described herein.

Figure 3:
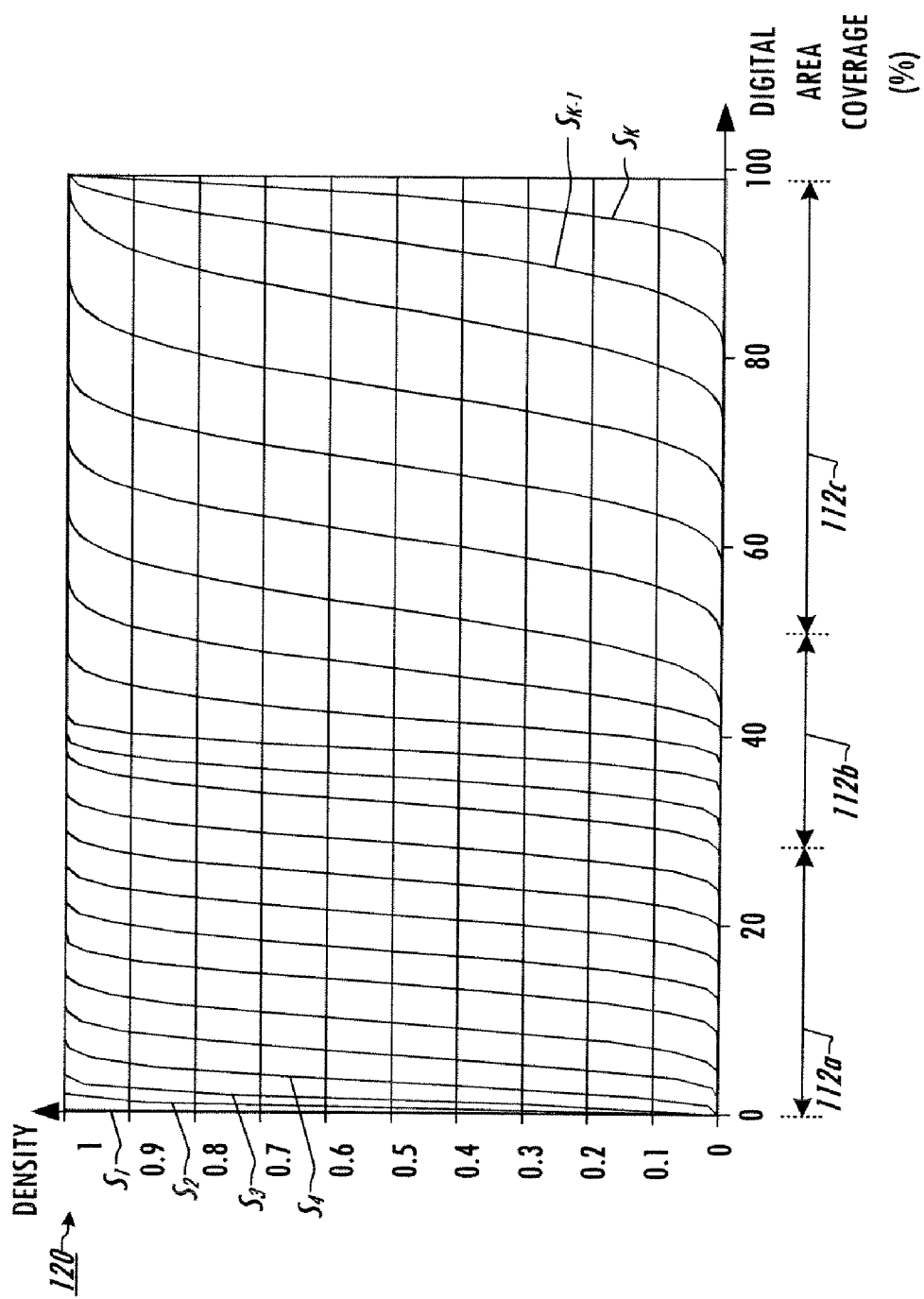
FIG. 3 is a graph showing a set of spline basis functions selected to provide a high density of splines within a high density region associated with measurement noise and/or high curvature of a measured TRC according to further aspects of the disclosure.
Figure 4:
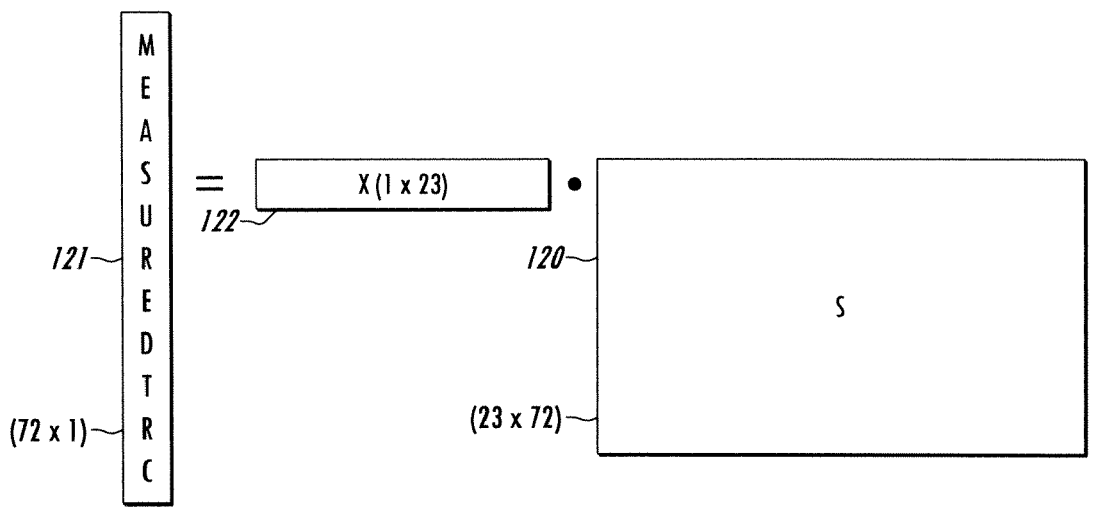
FIG. 4 is a schematic diagram illustrating an exemplary matrix equation used to find a least-squares solution to derive a matrix of spline weighting values.

The method 2 includes providing a set of spline basis functions at 10 in FIG. 1, where multi-color implementations may (but need not) involve provision of a separate spline basis function set for each color. Referring also to FIGS. 2-4, an exemplary set of spline basis functions 120 are illustrated in FIG. 3, including spline functions S1 through SK, where K is any integer greater than 2, such as 23 in the illustrated embodiment, and where the splines form a spline basis function vector [S] of dimension 23×72 in this example (FIG. 4). The basis functions S may be imported or calculated, for example, as described further in connection with FIGS. 2 and 3 below. At 20, a measured toner reproduction curve is provided (measured TRC 121 in FIGS. 4 and 6 below), which may be acquired by any suitable means, including without limitation using a device such as an ETAC sensor included in a printing system (system 202 in FIG. 5 below) to measure toner density on a photoreceptor intermediate transfer medium, or by using a spectrophotometer to measure marking material density on a final print medium (e.g., paper). Moreover, multiple measurements may be made at each point or at certain points of the TRC to increase the accuracy of the fit. The measured TRC 121 includes a plurality of measured density values 121 associated with a plurality of input density values for at least one color. In the illustrated examples, 72 points were used for the measured TRC 121 out of 256 possible values in an 8-bit machine TRC range for a given color.

Figure 9:
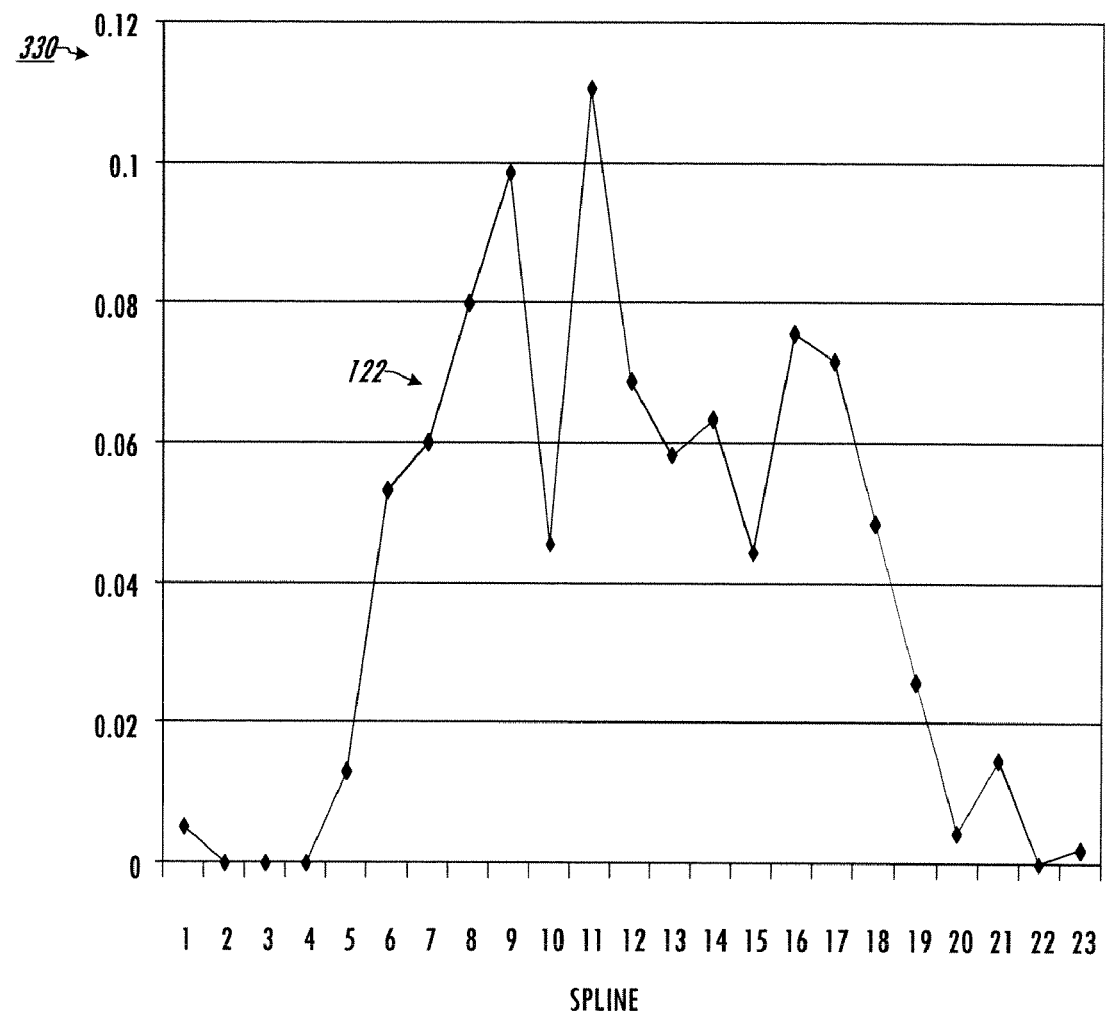
FIG. 9 is a graph illustrating an exemplary set of weighting coefficients obtained from a least-squares fit of the measured TRC of FIG. 6 for use in association with the set of splines in FIG. 3.

The method 2 further includes deriving a matrix at 30 of weighting coefficients 122 (e.g., a 1×23 matrix [X] of weighting values 122 as in the example of FIGS. 4 and 9 below) for the spline basis functions 120 by determining a solution at 32 for the matrix equation [measured TRC]=[X]*[S]. In one example, the weighting coefficients are determined by finding a least-squares solution to the equation. The least-squares solution to this equation may be solved by any suitable techniques, such as using a QR factorization procedure commonly available in many linear-algebra libraries. A discussion of QR factorization and it's uses in least squares fitting is found in section 14.3: General Linear Least Squares in "Numerical Recipes, The Art of Scientific Computing" by Press, Teukolsky, Flannery and Vetterling [Cambridge University Press, c 1986]. This book also includes example code primarily for teaching purposes. A public domain implementation of QR factorization for FORTRAN 77 supported by the National Science Foundation is available as the subroutine xGEQRF in the LAPACK linear algebra library. Other Linear Algebra libraries are available in the public domain and commercially for most programming languages. In accordance with an aspect of the disclosure, the use of carefully selected spline basis functions 120 facilitates the use of a least-squares solution to be calculated quickly using standard linear algebra libraries with a minimum of coding effort, although any suitable computation technique may be employed within a printing system or in an external system. One exemplary least-squares solution at 30 provides the 23 weighting values 122 shown in the graph 330 of FIG. 9, including the values 0.005141; 0; 0; 0; 0.013083; 0.053188; 0.060096; 0.079864; 0.09851; 0.045528; 0.110625; 0.06874; 0.05825; 0.063349; 0.044357; 0.075672; 0.07162; 0.048483; 0.025841; 0.004255; 0.01465; 0; 0.00203.

The determination of the weighting coefficients 122 at 30, moreover, may involve one or more iterations in certain embodiments, in order to ensure monotonic fitting. As shown in the example of FIG. 1, a determination is made at 34 as to whether any of the weighting coefficients 122 are negative. If not (NO at 34), the process proceeds to construct the spline fitted TRC 312 at 38 using the spline basis functions 120 and the calculated weighting coefficients 122. Otherwise (YES at 34), the negative coefficients are set to zero at 36 and the function(s) corresponding to the negative coefficient is removed from the set of spline basis functions 120. The weighting coefficients 122 are then recalculated at 32 by determining an adjusted solution for the matrix equation.

A spline fitted TRC (fitted curve 312 in FIG. 7 below) is constructed at 40 based on the spline basis functions 120 and the matrix [X] of weighting coefficients 122, where the resulting fitted TRC is a composite of the basis functions [S] weighted by the coefficients [X] to fit a curve according to the measured TRC values 121. At 40, a binary dot file 210 (FIG. 5) is formed at least partially based on the spline fitted TRC 312, and the dot file 210 is loaded at 50 into the printing system 202 for use in machine controls, or for printing customer print jobs. In an alternate implementation, a look-up table can be generated which remaps input TRC levels to the output levels required to get the desired density, and the lookup table can be loaded onto the printer 202. In this example, the method 2 may be employed in initial characterization of the printing system 202, and/or may be employed thereafter for calibration, wherein the curve fitting techniques may be employed in computing components within the printer 202 and/or using external systems or devices wherein all such alternate implementations are contemplated as falling within the scope of the present disclosure.

The fitted TRC construction may be done by any suitable technique within the scope of the present disclosure. In the embodiment of FIG. 1, the process 40 includes forming a threshold array at 42 that includes a value corresponding to each value in the machine TRC (e.g., 256 values in the illustrated 8-bit example), where the values of the threshold array indicate the number of pixels that must be turned on to achieve the measured value from the spline fitted TRC. The following Table 1 shows an exemplary 256 value threshold table formed for the exemplary 72-point measured TRC and the spline functions 120 above, where the printing system 202 is capable of generating over 13,312 possible density values for a given color, by turning on the laser in a halftone screen comprising 16 laser scanlines and 832 possible laser actuation time durations within each scanline.

TABLE 1

| Customer input | Dot Threshold output | Fitted TRC |
|---|---|---|
| 0 | 0 | 0.005141 |
| 1 | 532 | 0.006322 |
| 2 | 653 | 0.008371 |
| 3 | 757 | 0.011286 |
| 4 | 847 | 0.014934 |
| 5 | 925 | 0.018665 |
| 6 | 988 | 0.022396 |
| 7 | 1,046 | 0.026126 |
| 8 | 1,095 | 0.029856 |
| 9 | 1,144 | 0.033584 |
| 10 | 1,187 | 0.037312 |
| 11 | 1,228 | 0.04104 |
| 12 | 1,269 | 0.044766 |
| 13 | 1,307 | 0.048492 |
| 14 | 1,344 | 0.052218 |
| 15 | 1,381 | 0.055942 |
| 16 | 1,417 | 0.059666 |
| 17 | 1,451 | 0.06339 |
| 18 | 1,486 | 0.067112 |
| 19 | 1,520 | 0.070834 |
| 20 | 1,554 | 0.074556 |
| 21 | 1,587 | 0.078277 |
| 22 | 1,620 | 0.081997 |
| 23 | 1,653 | 0.085717 |
| 24 | 1,685 | 0.089436 |
| 25 | 1,717 | 0.093154 |
| 26 | 1,748 | 0.096872 |
| 27 | 1,780 | 0.10059 |
| 28 | 1,810 | 0.104307 |
| 29 | 1,840 | 0.108023 |
| 30 | 1,870 | 0.111739 |
| 31 | 1,900 | 0.115454 |
| 32 | 1,930 | 0.119169 |
| 33 | 1,958 | 0.122883 |
| 34 | 1,986 | 0.126597 |
| 35 | 2,014 | 0.13031 |

TABLE 1-continued

| Customer input | Dot Threshold output | Fitted TRC |
|---|---|---|
| 36 | 2,042 | 0.134023 |
| 37 | 2,069 | 0.137735 |
| 38 | 2,095 | 0.141447 |
| 39 | 2,121 | 0.145159 |
| 40 | 2,147 | 0.14887 |
| 41 | 2,174 | 0.15258 |
| 42 | 2,198 | 0.15629 |
| 43 | 2,223 | 0.16 |
| 44 | 2,248 | 0.163709 |
| 45 | 2,272 | 0.167418 |
| 46 | 2,297 | 0.171126 |
| 47 | 2,320 | 0.174834 |
| 48 | 2,343 | 0.178542 |
| 49 | 2,366 | 0.182249 |
| 50 | 2,390 | 0.185956 |
| 51 | 2,413 | 0.189663 |
| 52 | 2,436 | 0.193369 |
| 53 | 2,457 | 0.197075 |
| 54 | 2,479 | 0.20078 |
| 55 | 2,501 | 0.204485 |
| 56 | 2,523 | 0.20819 |
| 57 | 2,545 | 0.211895 |
| 58 | 2,566 | 0.215599 |
| 59 | 2,587 | 0.219303 |
| 60 | 2,608 | 0.223007 |
| 61 | 2,629 | 0.22671 |
| 62 | 2,650 | 0.230413 |
| 63 | 2,671 | 0.234116 |
| 64 | 2,692 | 0.237819 |
| 65 | 2,712 | 0.241521 |
| 66 | 2,733 | 0.245223 |
| 67 | 2,754 | 0.248925 |
| 68 | 2,775 | 0.252627 |
| 69 | 2,796 | 0.256328 |
| 70 | 2,817 | 0.260029 |
| 71 | 2,839 | 0.26373 |
| 72 | 2,860 | 0.267431 |
| 73 | 2,882 | 0.271132 |
| 74 | 2,904 | 0.274832 |
| 75 | 2,926 | 0.278533 |
| 76 | 2,948 | 0.282233 |
| 77 | 2,973 | 0.285933 |
| 78 | 2,997 | 0.289633 |
| 79 | 3,021 | 0.293333 |
| 80 | 3,046 | 0.297032 |
| 81 | 3,070 | 0.300732 |
| 82 | 3,098 | 0.304431 |
| 83 | 3,126 | 0.308131 |
| 84 | 3,155 | 0.31183 |
| 85 | 3,183 | 0.315529 |
| 86 | 3,213 | 0.319228 |
| 87 | 3,244 | 0.322927 |
| 88 | 3,275 | 0.326626 |
| 89 | 3,306 | 0.330325 |
| 90 | 3,337 | 0.334024 |
| 91 | 3,368 | 0.337723 |
| 92 | 3,398 | 0.341421 |
| 93 | 3,428 | 0.34512 |
| 94 | 3,459 | 0.348819 |
| 95 | 3,485 | 0.352518 |
| 96 | 3,512 | 0.356217 |
| 97 | 3,538 | 0.359915 |
| 98 | 3,565 | 0.363614 |
| 99 | 3,590 | 0.367313 |
| 100 | 3,613 | 0.371012 |
| 101 | 3,635 | 0.374711 |
| 102 | 3,657 | 0.37841 |
| 103 | 3,679 | 0.382109 |
| 104 | 3,702 | 0.385808 |
| 105 | 3,723 | 0.389507 |
| 106 | 3,742 | 0.393207 |
| 107 | 3,762 | 0.396906 |
| 108 | 3,782 | 0.400606 |
| 109 | 3,802 | 0.404305 |
| 110 | 3,822 | 0.408005 |
| 111 | 3,842 | 0.411705 |
| 112 | 3,861 | 0.415405 |
| 113 | 3,880 | 0.419105 |
| 114 | 3,899 | 0.422805 |
| 115 | 3,919 | 0.426506 |
| 116 | 3,938 | 0.430207 |
| 117 | 3,957 | 0.433907 |
| 118 | 3,976 | 0.437608 |
| 119 | 3,996 | 0.44131 |
| 120 | 4,016 | 0.445011 |
| 121 | 4,035 | 0.448713 |
| 122 | 4,055 | 0.452415 |
| 123 | 4,075 | 0.456117 |
| 124 | 4,095 | 0.459819 |
| 125 | 4,116 | 0.463521 |
| 126 | 4,137 | 0.467224 |
| 127 | 4,159 | 0.470927 |
| 128 | 4,180 | 0.474631 |
| 129 | 4,201 | 0.478334 |
| 130 | 4,223 | 0.482038 |
| 131 | 4,246 | 0.485742 |
| 132 | 4,269 | 0.489447 |
| 133 | 4,292 | 0.493152 |
| 134 | 4,316 | 0.496857 |
| 135 | 4,339 | 0.500562 |
| 136 | 4,363 | 0.504268 |
| 137 | 4,388 | 0.507974 |
| 138 | 4,412 | 0.511681 |
| 139 | 4,437 | 0.515388 |
| 140 | 4,462 | 0.519095 |
| 141 | 4,487 | 0.522802 |
| 142 | 4,513 | 0.52651 |
| 143 | 4,539 | 0.530219 |
| 144 | 4,565 | 0.533928 |
| 145 | 4,591 | 0.537637 |
| 146 | 4,617 | 0.541346 |
| 147 | 4,644 | 0.545056 |
| 148 | 4,670 | 0.548767 |
| 149 | 4,696 | 0.552478 |
| 150 | 4,723 | 0.556189 |
| 151 | 4,749 | 0.559901 |
| 152 | 4,775 | 0.563613 |
| 153 | 4,801 | 0.567326 |
| 154 | 4,826 | 0.571039 |
| 155 | 4,852 | 0.574753 |
| 156 | 4,877 | 0.578467 |
| 157 | 4,901 | 0.582182 |
| 158 | 4,925 | 0.585897 |
| 159 | 4,949 | 0.589613 |
| 160 | 4,974 | 0.593329 |
| 161 | 4,997 | 0.597046 |
| 162 | 5,020 | 0.600763 |
| 163 | 5,042 | 0.604481 |
| 164 | 5,064 | 0.608199 |
| 165 | 5,087 | 0.611919 |
| 166 | 5,109 | 0.615638 |
| 167 | 5,132 | 0.619358 |
| 168 | 5,155 | 0.623079 |
| 169 | 5,178 | 0.626801 |
| 170 | 5,201 | 0.630523 |
| 171 | 5,223 | 0.634245 |
| 172 | 5,246 | 0.637969 |
| 173 | 5,273 | 0.641692 |
| 174 | 5,299 | 0.645417 |
| 175 | 5,326 | 0.649142 |
| 176 | 5,352 | 0.652868 |
| 177 | 5,380 | 0.656595 |
| 178 | 5,415 | 0.660322 |
| 179 | 5,451 | 0.66405 |
| 180 | 5,487 | 0.667778 |
| 181 | 5,526 | 0.671508 |
| 182 | 5,570 | 0.675238 |
| 183 | 5,613 | 0.678968 |
| 184 | 5,657 | 0.6827 |
| 185 | 5,701 | 0.686432 |
| 186 | 5,744 | 0.690165 |
| 187 | 5,787 | 0.693899 |

TABLE 1-continued

| Customer input | Dot Threshold output | Fitted TRC |
|---|---|---|
| 188 | 5,830 | 0.697633 |
| 189 | 5,872 | 0.701368 |
| 190 | 5,914 | 0.705104 |
| 191 | 5,955 | 0.708841 |
| 192 | 5,997 | 0.712579 |
| 193 | 6,038 | 0.716317 |
| 194 | 6,079 | 0.720056 |
| 195 | 6,120 | 0.723796 |
| 196 | 6,161 | 0.727537 |
| 197 | 6,202 | 0.731279 |
| 198 | 6,243 | 0.735021 |
| 199 | 6,284 | 0.738765 |
| 200 | 6,326 | 0.742509 |
| 201 | 6,367 | 0.746254 |
| 202 | 6,409 | 0.75 |
| 203 | 6,451 | 0.753747 |
| 204 | 6,494 | 0.757494 |
| 205 | 6,536 | 0.761243 |
| 206 | 6,580 | 0.764993 |
| 207 | 6,624 | 0.768743 |
| 208 | 6,668 | 0.772494 |
| 209 | 6,713 | 0.776247 |
| 210 | 6,759 | 0.78 |
| 211 | 6,805 | 0.783754 |
| 212 | 6,853 | 0.787509 |
| 213 | 6,900 | 0.791265 |
| 214 | 6,949 | 0.795022 |
| 215 | 6,999 | 0.79878 |
| 216 | 7,049 | 0.802539 |
| 217 | 7,101 | 0.8063 |
| 218 | 7,153 | 0.810061 |
| 219 | 7,207 | 0.813823 |
| 220 | 7,262 | 0.817586 |
| 221 | 7,317 | 0.82135 |
| 222 | 7,374 | 0.825115 |
| 223 | 7,431 | 0.828881 |
| 224 | 7,491 | 0.832648 |
| 225 | 7,551 | 0.836417 |
| 226 | 7,614 | 0.840186 |
| 227 | 7,676 | 0.843956 |
| 228 | 7,742 | 0.847728 |
| 229 | 7,808 | 0.851501 |
| 230 | 7,878 | 0.855274 |
| 231 | 7,947 | 0.859049 |
| 232 | 8,021 | 0.862825 |
| 233 | 8,096 | 0.866602 |
| 234 | 8,173 | 0.870381 |
| 235 | 8,254 | 0.87416 |
| 236 | 8,337 | 0.87794 |
| 237 | 8,425 | 0.881722 |
| 238 | 8,516 | 0.885505 |
| 239 | 8,613 | 0.889289 |
| 240 | 8,714 | 0.893074 |
| 241 | 8,822 | 0.896861 |
| 242 | 8,939 | 0.900648 |
| 243 | 9,066 | 0.904437 |
| 244 | 9,206 | 0.908227 |
| 245 | 9,365 | 0.912018 |
| 246 | 9,554 | 0.915811 |
| 247 | 9,797 | 0.919605 |
| 248 | 10,163 | 0.923399 |
| 249 | 10,702 | 0.927196 |
| 250 | 11,148 | 0.930993 |
| 251 | 11,541 | 0.934732 |
| 252 | 11,922 | 0.937902 |
| 253 | 12,409 | 0.940384 |
| 254 | 13,025 | 0.942178 |
| 255 | 13,312 | 0.943284 |

The exemplary process of FIG. 1 also includes providing a fill order list at 44 indicating the order in which each pixel of a digital pattern is turned on for the printer system 202, which may be any suitable fill order list associated with half-toning within the scope of the disclosure. At 46, the binary dot file 210 (FIG. 5) is formed including a value corresponding to each value in the fill order list, with the values of the binary dot file 210 indicating the smallest index of the threshold array for which the threshold array value is greater than the value of the fill order list. In one implementation of this dot file generation procedure, for each element of the halftone screen, an integer would be read in from the fill order file, specifying the order in which that element would be turned on. This integer would be compared to each threshold value, starting at threshold 1. If the fill order value was greater than the threshold 1 value, it would be compared next to threshold 2, continuing until finally the fill order value was less than the value of the threshold. The index for this threshold (a byte between one and 255) would be written to an output halftone dot file. If no threshold value is greater than the fill order value (i.e. for the fill order value 13,312 in this example) then the byte 255 would be written to the output halftone dot file. The program would then continue onto the next integer in the fill order file, writing an output byte for each input integer, until the end of the fill file.

Figure 7:
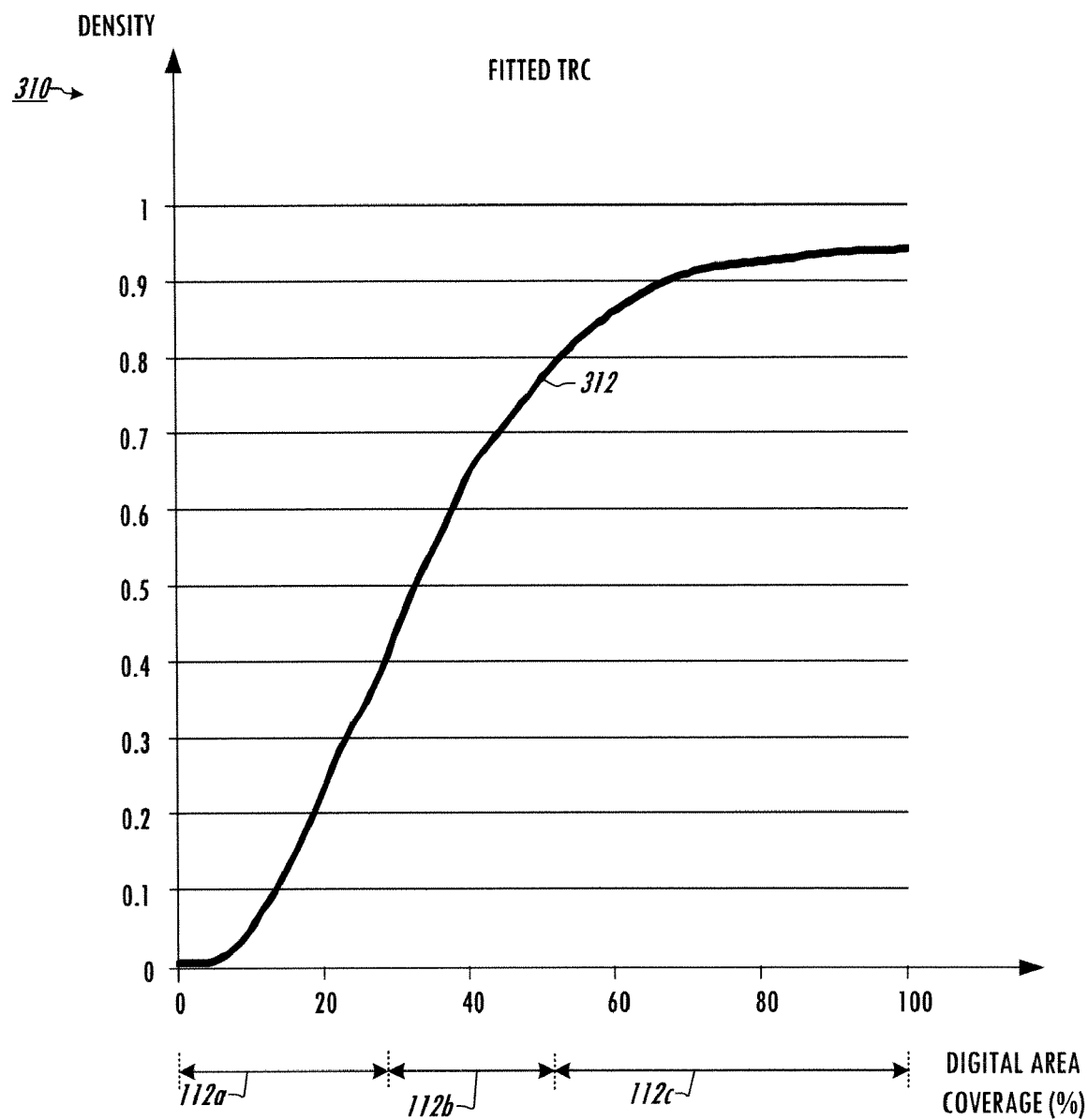
FIG. 7 is a graph illustrating an exemplary fitted TRC constructed according to the method of FIG. 1.
Figure 8:
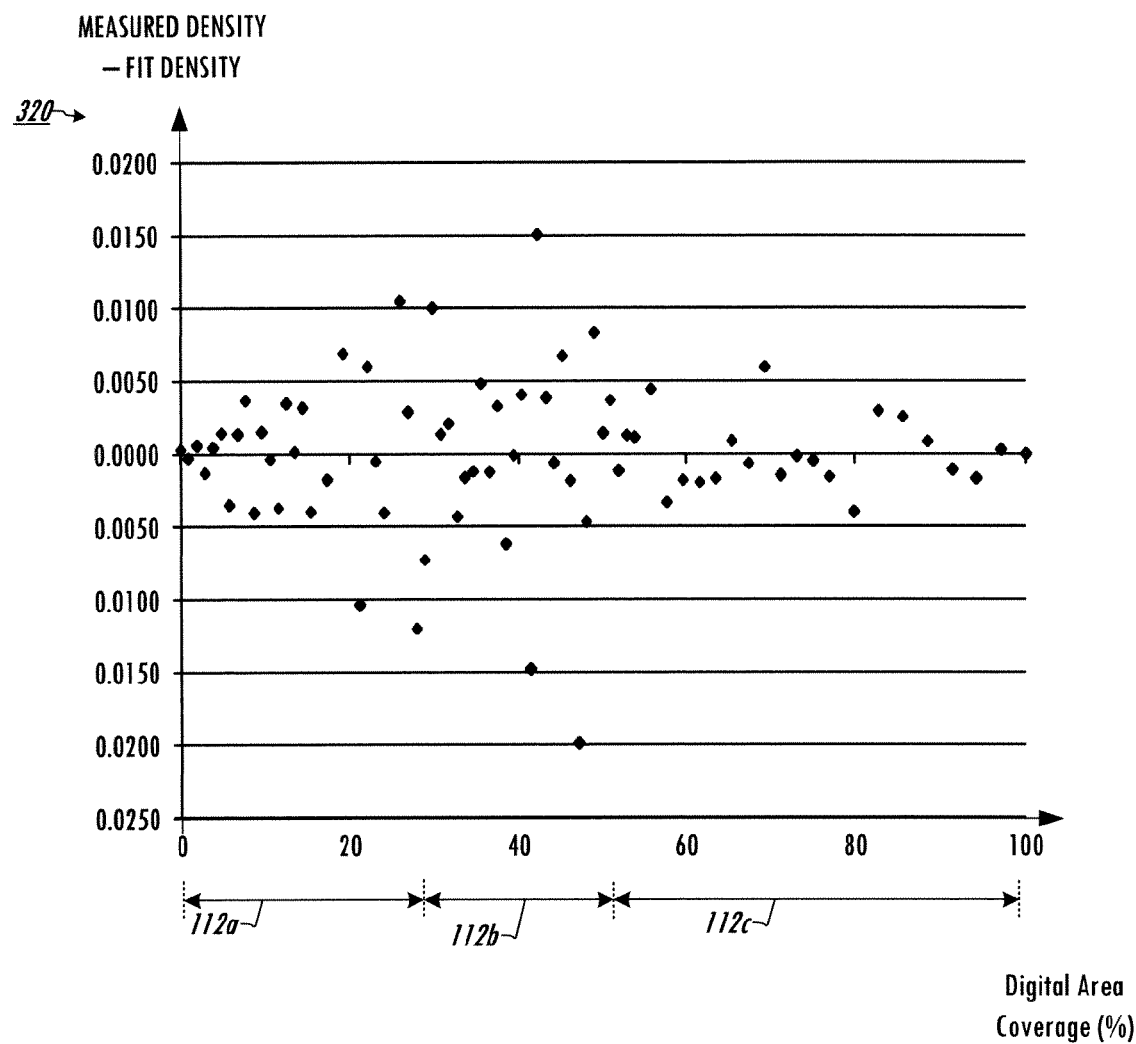
FIG. 8 is a graph illustrating measured density—fit density for the exemplary measured and fitted TRCs of FIGS. 6 and 7.
Figure 10:
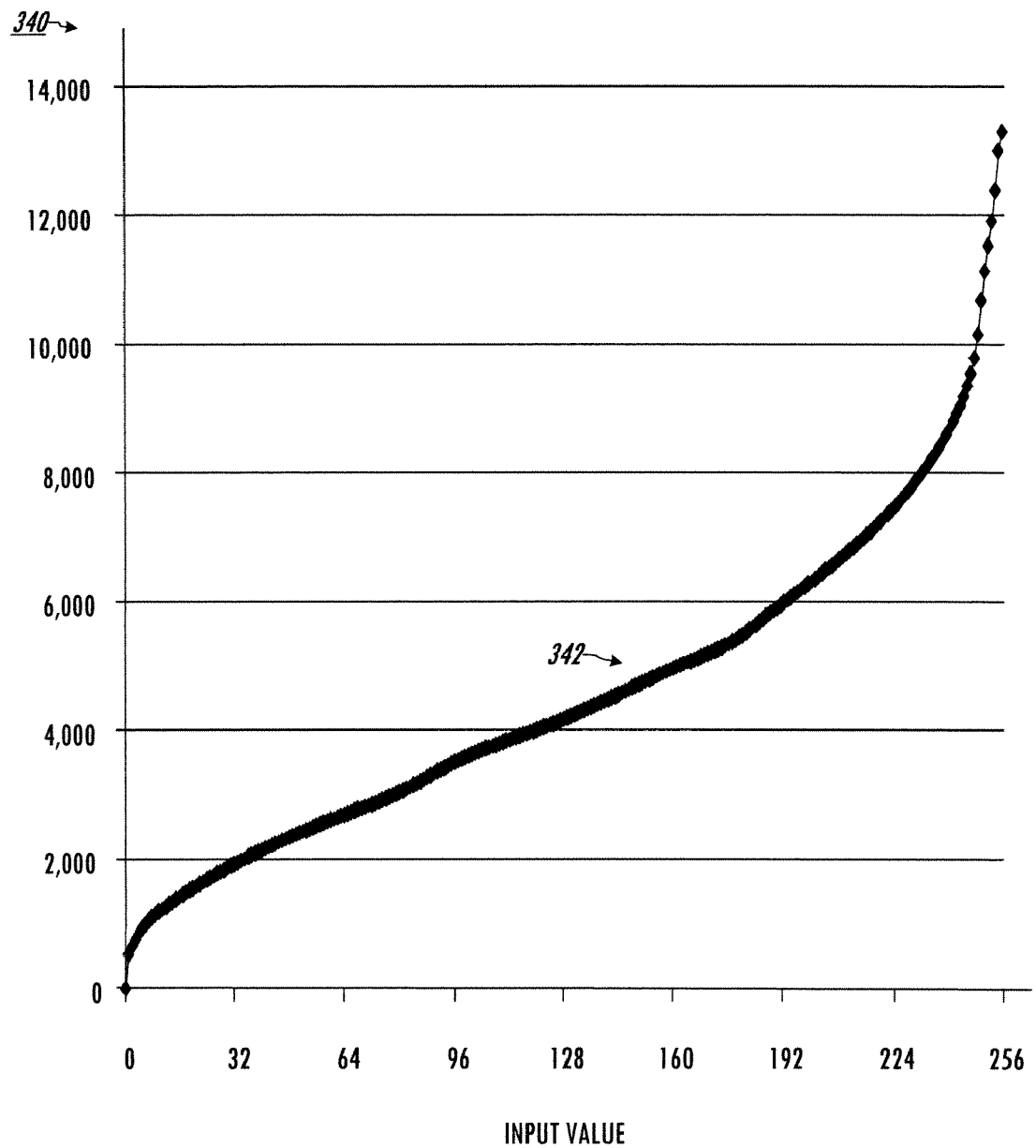
FIG. 10 is a graph illustrating a dot file curve showing the dot level required to achieve a desired density from the fitted TRC of FIG. 7.

The dot file may include many more levels than required to define a customer TRC, for example, where the dot file in the illustrated embodiment may define the turn-on pattern for 13,312 levels for a 256 value customer TRC, wherein the graph 340 in FIG. 10 illustrates a curve 342 depicting an exemplary dot file including values indicating the dot level (from 1 to above 13,000 in the illustrated system 202) required to achieve a desired output density from the fitted TRC 310, illustrated as a curve 312 in FIG. 7. In this example, 13,312 cells in a two dimensional grid are defined to accommodate a rendering mechanism in the printer 202 that generates 16 laser scan-lines in a slow scan direction and 832 fast-scan sub-pixels, where a sub-pixel represents the shortest amount of time (smallest distance) for which a laser actuator is turned on and then off again. For an example customer input of 100, all cells with values less than or equal to 100 will have the laser turned on, and will develop, while all cells with values greater than 100 will have the laser turned off, and will not develop toner. The threshold specifies how many additional cells are turned on for each level from 1 to 255, where the dot fill-in order file specifies the order in which each of the 13,312 cells should be turned on. In one example, if the threshold indicates 1000 cells should have a value of 34, the dot fill-in file specifies which 1000 sub-pixels should be turned on next. The dot file is loaded at 50 in FIG. 1 into the printer system 202 or other rendering device that will use this to generate printed/rendered images based on 8-bit customer input data.

Referring to FIGS. 2 and 3, monotonic spline basis functions 120 are preferably used, and may be characterized by a set of discrete points $(t_i \ldots t_{k+n})$, referred to as knots (23 splines 120 in the illustrated embodiment). Each spline $S_i$ has a value of 0 at all x values below $t_i$, and a value of 1 at all points above $t_{i+n}$, and follows an s-shaped curve for intervening values, where n is the order of the spline S, and where there are n fewer splines than knots. In one embodiment, the function which determines the spline value in the s-shaped region is chosen so that the $n^{th}$ derivative is continuous, where the simplest possible monotone spline would have order zero. The spline would be 0 below a knot, and 1 above a knot, with a step transition between. A function fit with a $0^{th}$ order spline 120 would look like a staircase, in which case even the first derivative would be discontinuous. A piecewise linear fit would result from $1^{st}$ order splines to yield a linear ramp between successive knots. Visually smooth splines are preferred, at least for the majority of the basis functions 120 having $2^{nd}$ or higher orders to provide continuous second derivatives, and more preferably the majority of the selected splines 120 are of order 3 or higher within the scope of the present disclosure. The set of equations 100 in FIG. 2 define an exemplary $3^{rd}$ order spline employed in the illustrated embodiments. The graph 110 in FIG. 3 illustrates set of Spline Basis vectors $S_1$ through $S_K$ used for the magenta and black dots. Note that there are more vectors in the toe (highlight) area of the TRC, where density is changing rapidly, and fewer vectors in the shadow region, which is typically flat. These curves were generated from the set of knots: 0; 0; 0; 0; 2; 4; 8; 16; 32; 42; 44; 54; 62; 70; 78; 86; 96; 104; 104; 104. Duplicate knots are employed in this example at the beginning and end of the curve, moreover, to give smooth behavior at the boundaries. Although the exemplary implementations are illustrated and described in the context of third order spline basis functions, splines of other orders may be used and all such alternate embodiments are contemplated as falling within the scope of the present disclosure.

Various aspects of the disclosure provide for fitting a measured TRC in a smooth, monotonic way, using a least-squares error (LSE) approach and a set of $3^{rd}$ order spline basis functions 120 having a functional range [0,1] between the digital area coverage (percentage) range [ti, ∞] for set i. The weights of the spline functions, moreover, are preferably restricted to positive values in order to maintain monotonicity in the TRC, as is advantageous for image rendering applications involving marking material density (brightness and darkness). Splines with negative weights in this regard, are preferably removed from the set of basis functions 120 in the iterative LSE minimization process (e.g., at 34 and 36 in FIG. 1). The number of spline basis functions, moreover, is preferably adjusted to reflect known engine/dot pattern behavior. Subsequently, the print engine is linearized by the spline fitted TRC 310 by definition of a desired TRC for each of the values in the input data (e.g. 256 values of the machine TRC) such that the fitted TRC 310 determines the dot which will produce the desired response in rendering/printing a customer image, so as to produce a smooth, contour-free TRC for each of the color channels.

As shown in FIGS. 3 and 6-8, moreover, the disclosure advantageously contemplates defining one or more high density regions (e.g., region 112*b*) and at least one low density region (112*c*) in the 256 value range of the machine TRC, based at least partially on the measured TRC 121 in one example. Alternatively, the high density regions can be set to correspond to regions in the machine TRC expected to have high TRC curvature. The high density region(s) thus corresponds to an area of the measured TRC exhibiting higher curvature than the low density region(s). Decreasing spline density in the low density region(s) decreases the sensitivity of the fit to noise, in areas where the TRC slope is not expected to change rapidly. In this aspect of the disclosure, the set of spline functions 120 are selectively chosen so as to provide a higher density of spline basis functions in the high density region(s) than in the low density region(s). Accordingly, the spline spacing is tighter in the high density region 112*b* than in the region 112*c* (FIG. 3), so as to accommodate high TRC curvature in the region 112*b* of the measured TRC 121 (FIG. 6), while providing increased noise reduction in the region 112*c*. For a particular half-tone dot design, moreover, the digital area coverage value in a machine TRC at which a new row of pixels has been started may be known in advance, and accordingly additional knots can be placed at this point to accommodate a discontinuity in the curve. Moreover, fewer knots can be placed in areas where the TRC is known to be smoothly varying. This type of selectivity in the spline functions 120 facilitates adjustability in the stiffness of the fit as well as selective use of discontinuities.

Figure 5:
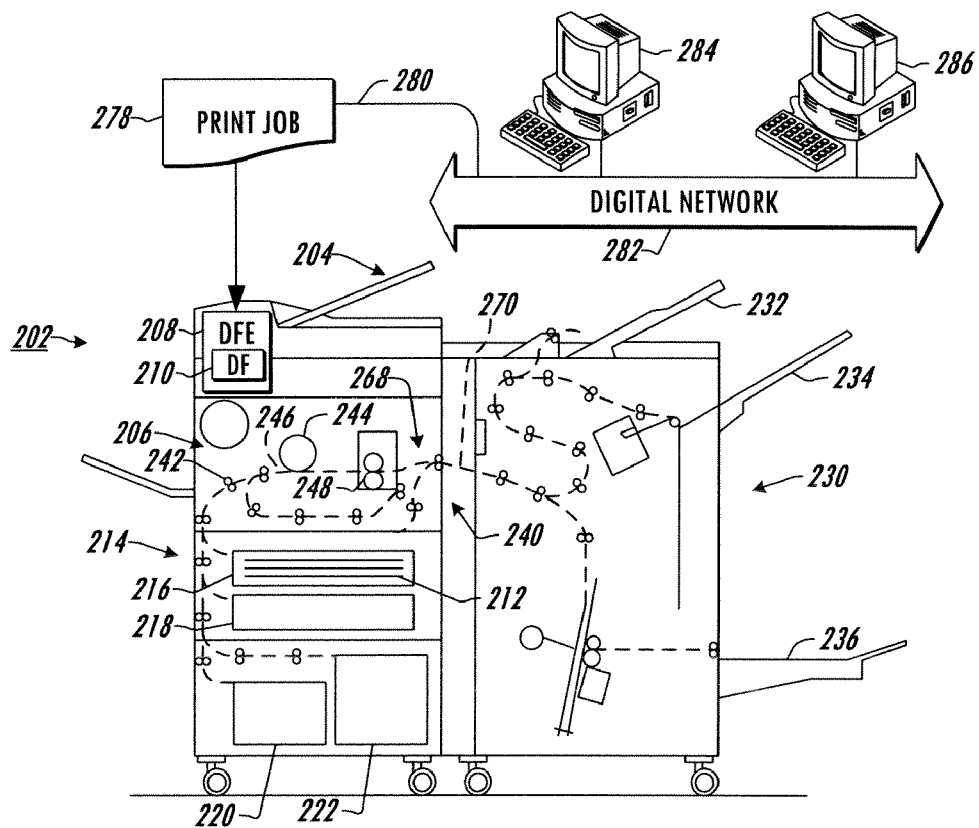
FIG. 5 is a schematic system level diagram illustrating an exemplary document processing system with a print engine and a digital front end which may be calibrated and/or characterized using the fitted TRC according to one or more aspects of the present disclosure.
Figure 6:
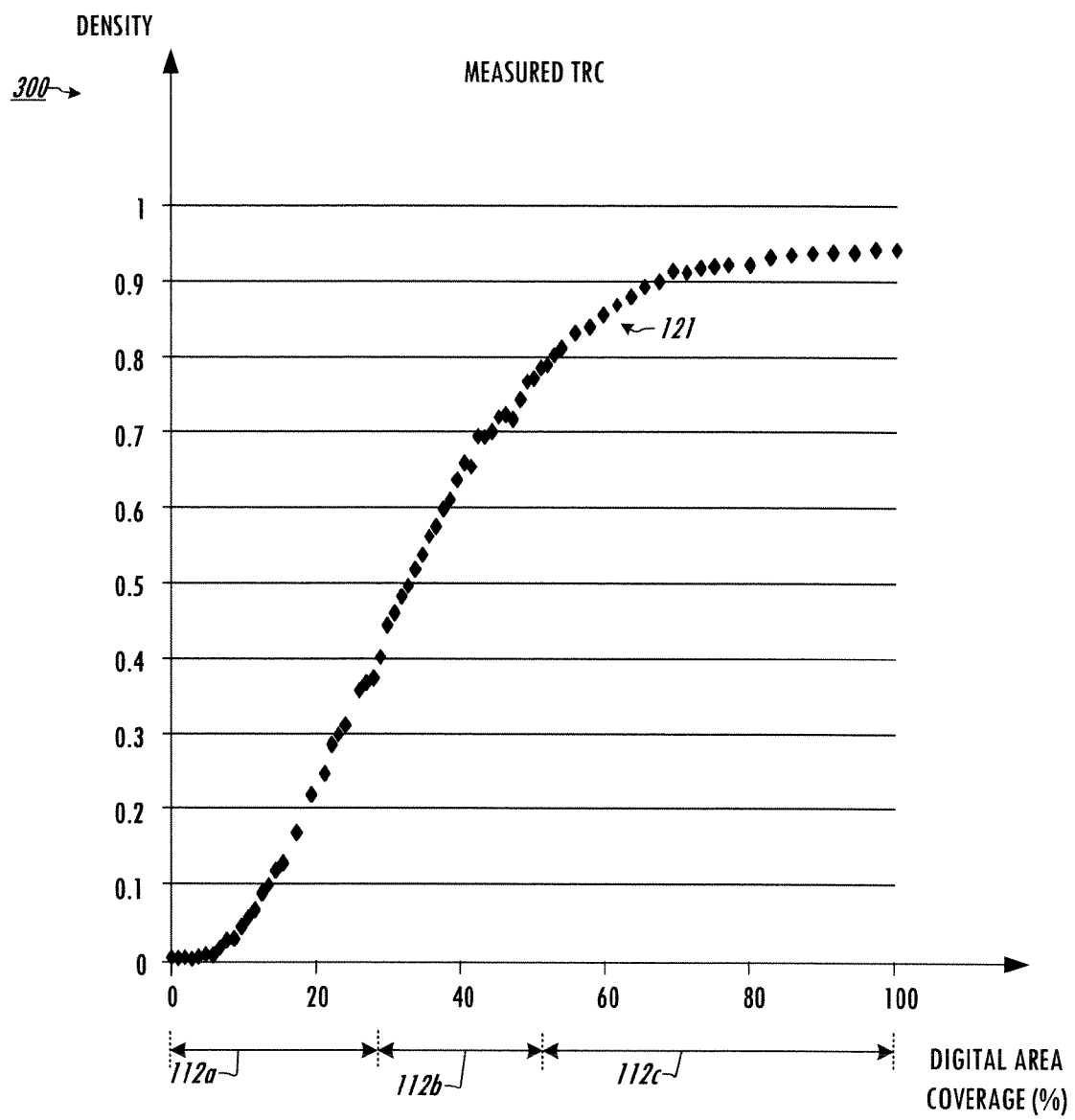
FIG. 6 is a graph illustrating an exemplary measured TRC.

The above described techniques can be employed in calibrating and/or characterizing any form of image rendering device, including without limitation printing systems. FIG. 5 illustrates an exemplary multi-color document processing or printing system 202 provided with a dot file 210 in accordance with one or more exemplary aspects of the disclosure. While illustrated in the context of a single print engine system 2, the various aspects of the disclosure may be implemented in association with document processing systems having multiple print engines, one or more of which may be single-color rendering devices. The system 202 of FIG. 5 can be any form of commercial printing apparatus, copier, printer, facsimile machine, or other system which may include a scanner or other input device 204 that scans an original document text and/or images to create an image comprising pixel values indicative of the colors and/or brightness of areas of the scanned original, or receives images such as in a print job, and which has a marking engine or print engine 206 by which visual images, graphics, text, etc. are printed on a page or other printable medium, including xerographic, electro photographic, and other types of printing technology, wherein such components are not specifically illustrated in FIG. 5 to avoid obscuring the various TRC fitting aspects of the present disclosure.

As shown in FIG. 5, the exemplary document processing system 202 includes a print engine 206, which may be any device or marking apparatus for applying an image from a digital front end (DFE) printer job controller 208 to printable media (print media) such as a physical sheet of paper, plastic, or other suitable physical media substrate for images, whether precut or web fed, where the input device 204, print engine 206, and controller 208 are interconnected by wired and/or wireless links for transfer of electronic data therebetween, including but not limited to telephone lines, computer cables, ISDN lines, etc. The printing system 202, moreover, includes an integral user interface 210 with a display and suitable operator/user controls such as buttons, touch screen, etc. The print engine 206 generally includes hardware and software elements employed in the creation of desired images by electrophotographic processes wherein suitable print engines 206 may also include ink-jet printers, such as solid ink printers, thermal head printers that are used in conjunction with heat sensitive paper, and other devices capable of printing or marking an image on a printable media.

The image input device 204 may include or be operatively coupled with conversion components for converting the image-bearing documents to image signals or pixels or such function may be assumed by the printing engine 206. In the illustrated document processor 202, the printer controller 208 provides the output pixel data from memory to a print engine 206 that is fed with a print media sheets 212 from a feeding source 214 such as a paper feeder which can have one or more print media sources or paper trays 216, 218, 220, 222, each storing sheets of the same or different types of print media 212 on which the marking engine 206 can print. The exemplary print engine 206 includes an imaging component 244 and an associated fuser 248, which may be of any suitable form or type, and may include further components which are omitted from the figure so as not to obscure the various aspects of the present disclosure. In one example, the print engine 206 may include a photoconductive insulating member or photoreceptor which is charged to a uniform potential via a corotron and exposed to a light image of an original document to be reproduced via an imaging laser under control of a controller of the DFE 208, where the exposure discharges the photoconductive insulating surface of the photoreceptor in exposed or background areas and creates an electrostatic latent image on the photoreceptor corresponding to image areas of the original document. The electrostatic latent image on the photoreceptor is made visible by developing the image with an imaging material such as a developing powder comprising toner particles via a development unit, and the customer image is then transferred to the print media 212 and permanently affixed thereto in the fusing process.

In a multicolor electrophotographic process, successive latent images corresponding to different colors can be formed on the photoreceptor and developed with a respective toner of a complementary color, with each color toner image being successively transferred to the paper sheet 212 in superimposed registration with the prior toner image to create a multi-layered toner image on the printed media 212, and where the superimposed images may be fused contemporaneously, in a single fusing process. The fuser 248 receives the imaged print media from the image-forming component and fixes the toner image transferred to the surface of the print media 212, where the fuser 248 can be of any suitable type, and may include fusers which apply heat or both heat and pressure to an image. Printed media from the printing engine 206 is delivered to a finisher 230 including one or more finishing output destinations 232, 234, 236 such as trays, stackers, pans, etc.

The document processing system 202 is operative to perform these scanning and printing tasks in the execution of print jobs, which can include printing selected text, line graphics, images, machine ink character recognition (MICR) notation, etc., on either or both of the front and back sides or pages of one or more media sheets 212. An original document or image or print job or jobs can be supplied to the printing system 202 in various ways. In one example, the built-in optical scanner 204 may be used to scan an original document such as book pages, a stack of printed pages, or so forth, to create a digital image of the scanned document that is reproduced by printing operations performed by the printing system 202 via the print engine 206. Alternatively, the print jobs can be electronically delivered to the system controller 208 via a network or other means, for instance, whereby a network user can print a document from word processing software running on a network computer 284 or 286 with a print job 278 being sent to the DFE 208 of the processing system 202 via a connection 280 to a digital network 282 thereby generating an input print job.

A print media transporting system or network or highway 240 of the document processing system 202 links the print media source 214, the print engine 206, and the finisher 230 via a network of flexible automatically feeding and collecting drive members, such as pairs of rollers 242, spherical nips, air jets, or the like, along with various motors for the drive members, belts, guide rods, frames, etc. (not shown), which, in combination with the drive members, serve to convey the print media 212 along selected pathways at selected speeds. Print media 212 is thus delivered from the source 214 to the print engine 206 via a pathway 246 common to the input trays 216, 218, 220, 222, and is printed by the imaging component 244 and fused by the fuser 248, with a pathway 246 from the print engine 206 merging into a pathway 270 which conveys the printed media 212 to the finisher 230, where the pathways 246, 248, 270 of the network 240 may include inverters, reverters, interposers, bypass pathways, and the like as known in the art. In addition, the print engine 206 may be configured for duplex or simplex printing and a single sheet of paper 212 may be marked by two or more print engines 206 or may be marked a plurality of times by the same marking engine 206, for instance, using internal duplex pathways.

Figure 11:
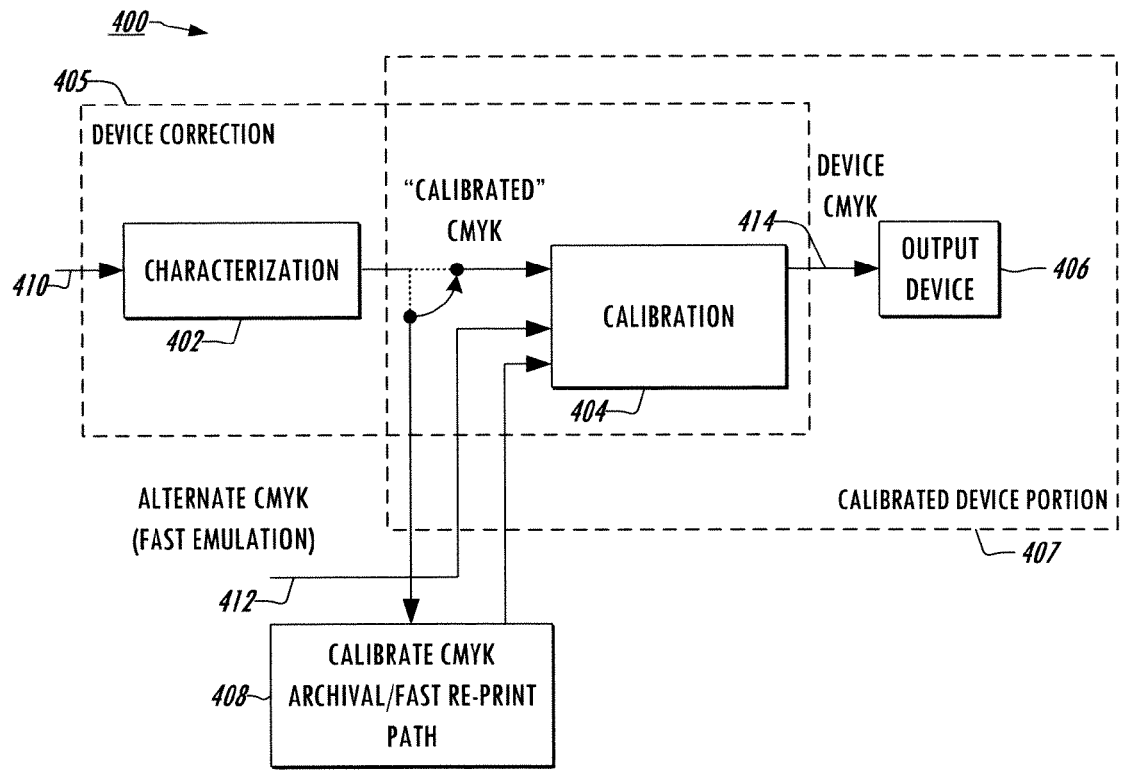
FIG. 11 is a schematic diagram illustrating an exemplary printing system that partitions a device-correction function into characterization and calibration.
Figure 12:
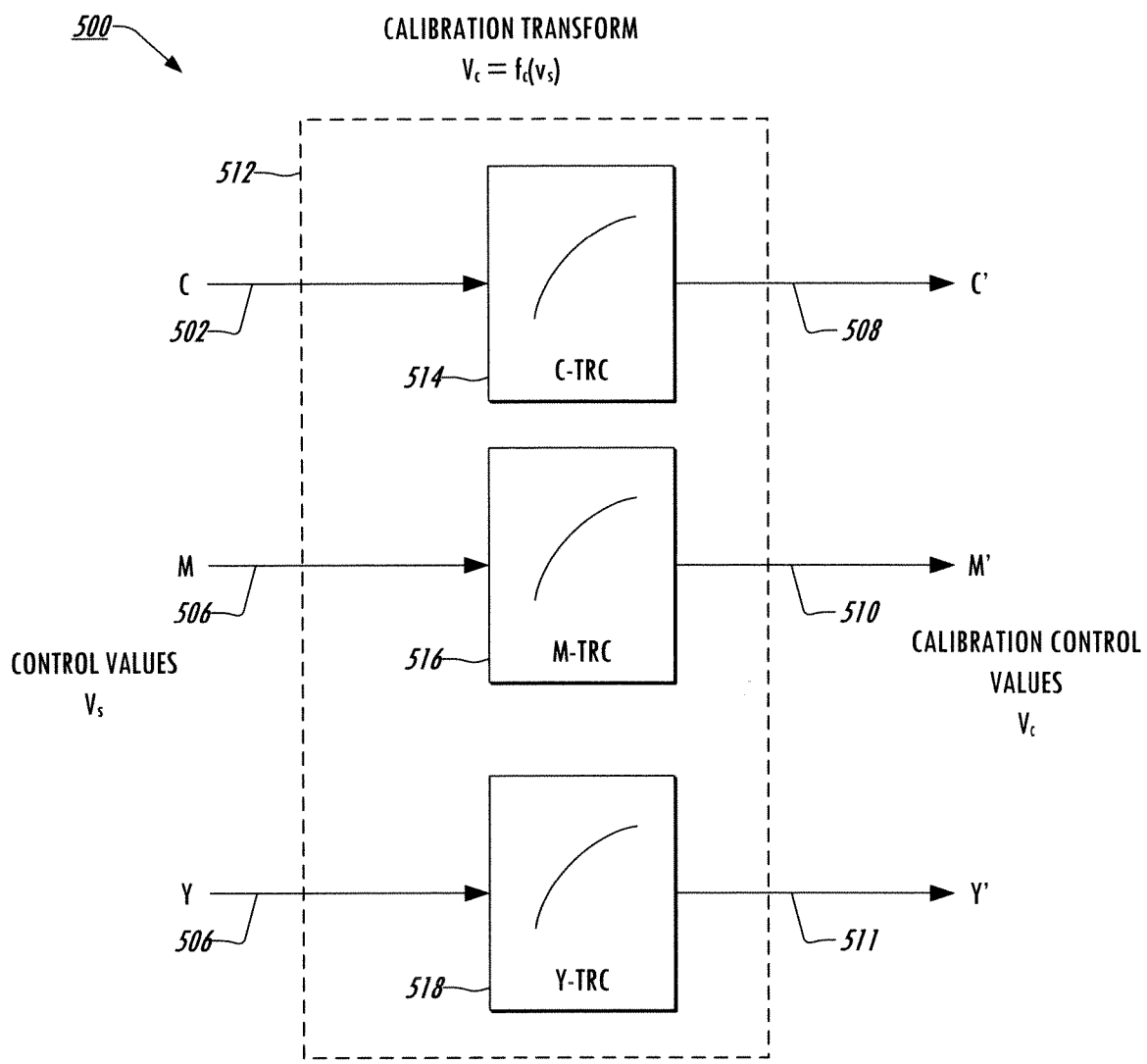
FIG. 12 is a schematic diagram illustrating an exemplary three-color one-dimensional calibration transformation system that may employ a fitted TRC in accordance with the present disclosure.

As discussed above, the described TRC fitting techniques can be employed in either or both of calibration or device characterization operations in a rendering system. Referring briefly to FIGS. 11 and 12, a general device correction function may include both a calibration that immediately precedes the device and a characterization which addresses the device "through" the calibration function. This example is schematically illustrated in FIG. 11 for the case of a CMYK printing system 400, which partitions "device-correction function" into characterization and calibration. For example, system 400 includes a printer-independent-color which can be provided as input 410 to a characterization routine 402 whose output is fed to a calibration unit 404, whose output in turn is fed to an output device 406 via output line 414. Additionally, lines 408 and 412 indicate alternate CMYK paths used for fast reprint and fast emulation, respectively, which are fed to calibration unit 404.

The purpose of the calibration transformation is to facilitate a trade-off. Unlike the full device-correction function, the calibration transformation provides control of the output device only in a limited fashion. However, in comparison to the full device-correction function the calibration transformation also offers significant advantages in that it requires substantially reduced measurement effort and also a substantially lower computational effort. The lower computational effort requirement allows it to be incorporated in high-speed real-time printing image-processing chains for which the full device-correction function may be too computation and/or memory intensive. For color output devices, particularly those utilized in the printing arts, calibration is typically performed for the Black channel (K) independently and for the Cyan (C), Magenta (M), and Yellow (Y) channels either independently or together.

In an exemplary three channel (CMY) color printer example, calibration may be used to determine a calibration transform from CMY to C'M'Y' that maintains a desired printer response in selected regions of color space. Additionally, the calibration transform is preferably computationally efficient with a small memory requirement so that it can be incorporated in high-speed real-time printing paths. Traditionally, the calibration transform has been applied in the form of one-dimensional correction to the individual channels for the device. For CMY, the calibration is applied as three TRCs for each of the C, M, and Y channels. FIG. 12 illustrates a traditional three-color one-dimensional calibration transformation system 500 with arrows 502, 504 and 506 representing C, M, and Y inputs to transformations 514, 516, and 518, respectively. Dashed line 512 generally indicates the boundaries of a calibration transformation, which is composed of individual transformations 514, 516, and 518. Outputs are indicated by arrows 508, 510 and 511, which respectively represent C', M' and Y'. It can thus be appreciated that the following equation applies to system 500 of FIG. 12:

$$C'=f_1(C), M'=f_2(M), Y'=f_3(Y)$$

Furthermore, the techniques above can be employed in generating spline fitted TRCs for use in such calibration and/or device characterizations and in other applications for image rendering systems.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of calibrating or characterizing a printing system with respect to at least one color, the method comprising:

providing a set of spline basis functions as a vector [S];

providing a measured toner reproduction curve (TRC) including a plurality of measured density values associated with a plurality of input density values for the at least one color, the plurality of input density values selected from values of a machine TRC for the at least one color;

deriving a matrix [X] of weighting coefficients for the spline basis functions by determining a least-squares solution for the matrix equation [measured TRC]=[X]*[S];

constructing a spline fitted TRC based on the spline basis functions and the matrix [X] of weighting coefficients;

forming a binary dot file based at least in part on the spline fitted TRC; and loading the binary dot file into the printing system for use in printing.

2. The method of claim 1, wherein at least a majority of the spline basis functions are of second or higher order.

3. The method of claim 1, wherein if any of the weighting coefficients are negative, determining the least squares solution comprises:

setting the negative coefficients to zero;

removing the corresponding function from the set of spline basis functions; and recalculating to determine an adjusted least-squares solution for the matrix equation [measured TRC]=[X]*[S] to derive the matrix [X] of weighting coefficients for the spline basis functions.

4. The method of claim 1, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

5. The method of claim 1, further comprising:

defining at least one high density region and at least one low density region in the machine TRC based at least partially on the measured TRC, the at least one high density region corresponding to an area of the measured TRC exhibiting higher curvature than the at least one low density region;

wherein providing the set of spline basis functions comprises providing a higher density of spline basis functions in the at least one high density region than in the at least one low density region.

6. The method of claim 5, wherein at least a majority of the spline basis functions are of second or higher order.

7. The method of claim 5, wherein if any of the weighting coefficients are negative, determining the least squares solution comprises:

setting the negative coefficients to zero;

removing the corresponding function from the set of spline basis functions; and recalculating to determine an adjusted least-squares solution for the matrix equation [measured TRC]=[X]*[S] to derive the matrix [X] of weighting coefficients for the spline basis functions.

8. The method of claim 7, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

9. The method of claim 5, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

10. A method of calibrating or characterizing a printing system with respect to at least one color, the method comprising:

providing a measured toner reproduction curve (TRC) including a plurality of measured density values associated with a plurality of input density values for the at least one color, the plurality of input density values selected from values of a machine TRC for the at least one color;

defining at least one high density region and at least one low density region in the machine TRC based at least partially on the measured TRC, the at least one high density region corresponding to an area of the measured TRC exhibiting higher curvature than the at least one low density region;

providing a set of spline basis functions as a vector [S] having a higher density of spline basis functions in the at least one high density region than in the at least one low density region;

deriving a matrix [X] of weighting coefficients for the spline basis functions by determining a solution for the matrix equation [measured TRC]=[X]*[S];

constructing a spline fitted TRC based on the spline basis functions and the matrix [X] of weighting coefficients;

forming a binary dot file based at least in part on the spline fitted TRC; and loading the binary dot file into the printing system for use in printing.

11. The method of claim 10, wherein at least a majority of the spline basis functions are of second or higher order.

12. The method of claim 11, wherein if any of the weighting coefficients are negative, determining the solution comprises:

setting the negative coefficients to zero;

removing the corresponding function from the set of spline basis functions; and recalculating to determine an adjusted solution for the matrix equation [measured TRC]=[X]*[S] to derive the matrix [X] of weighting coefficients for the spline basis functions.

13. The method of claim 12, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

14. The method of claim 11, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

15. The method of claim 10, wherein if any of the weighting coefficients are negative, determining the solution comprises:

setting the negative coefficients to zero;

removing the corresponding function from the set of spline basis functions; and recalculating to determine an adjusted solution for the matrix equation [measured TRC]=[X]*[S] to derive the matrix [X] of weighting coefficients for the spline basis functions.

16. The method of claim 15, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

17. The method of claim 10, wherein forming the binary dot file comprises:

forming a threshold array including a value corresponding to each value in the machine TRC, the values of the threshold array indicating the number of pixels that must be turned on to achieve the measured value from the spline fitted TRC;

providing a fill order list indicating the order in which each pixel of a digital pattern is turned on for the printer system; and forming the binary dot file including a value corresponding to each value in the fill order list, the values of the binary dot file indicating the smallest index of the threshold array for which the threshold array value is greater than the value of the fill order list.

* * * * *